United States Patent
Sado et al.

(10) Patent No.: US 12,528,275 B2
(45) Date of Patent: Jan. 20, 2026

(54) LAMINATE, METHOD FOR PRODUCING SAME AND PREPREG

(71) Applicant: Toray Industries, Inc., Tokyo (JP)

(72) Inventors: Yuki Sado, Ehime (JP); Hiroaki Sakata, Ehime (JP)

(73) Assignee: Toray Industries, Inc., Tokyo (JP)

( * ) Notice: Subject to any disclaimer, the term of this patent is extended or adjusted under 35 U.S.C. 154(b) by 309 days.

(21) Appl. No.: 18/269,809

(22) PCT Filed: Jan. 13, 2022

(86) PCT No.: PCT/JP2022/000869
§ 371 (c)(1),
(2) Date: Jun. 27, 2023

(87) PCT Pub. No.: WO2022/154041
PCT Pub. Date: Jul. 21, 2022

(65) Prior Publication Data
US 2024/0051281 A1 Feb. 15, 2024

(30) Foreign Application Priority Data

Jan. 15, 2021 (JP) .................... 2021-004711
Feb. 8, 2021 (JP) .................... 2021-017944

(51) Int. Cl.
| | | |
|---|---|---|
| B32B 27/20 | (2006.01) | |
| B32B 27/08 | (2006.01) | |
| B32B 27/28 | (2006.01) | |
| B32B 27/38 | (2006.01) | |
| C08G 59/50 | (2006.01) | |
| C08J 5/24 | (2006.01) | |
| C08K 3/02 | (2006.01) | |
| C08K 7/06 | (2006.01) | |

(52) U.S. Cl.
CPC .............. *B32B 27/20* (2013.01); *B32B 27/08* (2013.01); *B32B 27/286* (2013.01); *B32B 27/38* (2013.01); *C08G 59/5033* (2013.01); *C08J 5/243* (2021.05); *C08J 5/249* (2021.05); *C08K 3/02* (2013.01); *C08K 7/06* (2013.01); B32B 2260/046 (2013.01); B32B 2305/076 (2013.01); B32B 2305/188 (2013.01); B32B 2307/3065 (2013.01); B32B 2307/732 (2013.01); B32B 2363/00 (2013.01); C08J 2363/00 (2013.01); C08K 2003/026 (2013.01); C08K 2201/003 (2013.01)

(58) Field of Classification Search
CPC .......... B32B 5/14; B32B 5/145; B32B 27/18; B32B 27/20; C08K 3/016; C08K 3/32; C08K 2003/026
See application file for complete search history.

(56) References Cited

U.S. PATENT DOCUMENTS

| | | | |
|---|---|---|---|
| 2012/0058325 | A1 | 3/2012 | Honma et al. |
| 2013/0202873 | A1 | 8/2013 | Mizuki et al. |
| 2013/0316169 | A1 | 11/2013 | Matsuda et al. |
| 2015/0336335 | A1 | 11/2015 | Okawa et al. |
| 2022/0074133 | A1 | 3/2022 | Nakayama et al. |
| 2022/0266543 | A1 | 8/2022 | Iwata |

FOREIGN PATENT DOCUMENTS

| | | |
|---|---|---|
| CN | 104553177 A | 4/2015 |
| CN | 107353775 A | 11/2017 |
| JP | 11105196 A | 4/1999 |
| JP | 2007016121 A | 1/2007 |
| JP | 2007231073 A | 9/2007 |
| JP | 2007331369 A | 12/2007 |
| JP | 2008214547 A | 9/2008 |
| JP | 2011230408 A | 11/2011 |
| WO | 2005082982 A1 | 9/2005 |
| WO | 2012039456 A1 | 3/2012 |
| WO | 2012133096 A1 | 10/2012 |
| WO | 2014109021 A1 | 7/2014 |
| WO | 2020/137346 A1 | 7/2020 |
| WO | 2021039590 A1 | 3/2021 |

OTHER PUBLICATIONS

JP 2008-214547 Machine Translation (Year: 2008).*
Extended European Search Report issued Oct. 7, 2024, by the European Patent Office in corresponding European Patent Application No. 22739446.7-1102. (66 pages).
International Search Report and Written Opinion for International Application No. PCT/JP2022/000869, dated Mar. 22, 2022, 8 pages.
Office Action (Notice of Reasons for Refusal) issued Sep. 30, 2025, by the Japanese Patent Office in corresponding Japanese Patent Application No. 2022-502854 and an English translation of the Office Action. (16 pages).
Notice of Submission of Publication issued Nov. 28, 2025, by the Japanese Patent Office in corresponding Japanese Patent Application No. 2022-502854 and an English translation of the Notice of Submission of Publication. (2 pages).
Submission of Publication issued Nov. 28, 2025, by the Japanese Patent Office in corresponding Japanese Patent Application No. 2022-502854 and an English translation of the Submission of Publication. (25 pages).

* cited by examiner

*Primary Examiner* — Zachary M Davis

(74) *Attorney, Agent, or Firm* — Buchanan Ingersoll & Rooney PC

(57) ABSTRACT

A lightweight laminate capable of maintaining mechanical properties while exhibiting excellent flame retardancy, a method for producing the laminate, and a prepreg are described, where the laminate includes fibers; a matrix resin; and a flame-retardant filler and satisfies 0.01<A/B<0.15 under the described conditions where A and B are as defined. The prepreg includes fibers; a matrix resin; and a flame-retardant filler and satisfies 0.01<A/B<0.15 under the described conditions where A and B are as defined.

7 Claims, No Drawings

LAMINATE, METHOD FOR PRODUCING SAME AND PREPREG

CROSS REFERENCE TO RELATED APPLICATIONS

This application is the U.S. National Phase of PCT/JP2022/000869, filed Jan. 13, 2022, which claims priority to Japanese Patent Application No. 2021-004711, filed Jan. 15, 2021 and Japanese Patent Application No. 2021-017944, filed Feb. 8, 2021, the disclosures of these applications being incorporated herein by reference in their entireties for all purposes.

FIELD OF THE INVENTION

The present invention relates to a laminate, a method for producing the laminate, and a prepreg.

BACKGROUND OF THE INVENTION

Carbon fiber composite materials including reinforcing fibers, particularly carbon fibers and a matrix resin are excellent in mechanical properties, and therefore are used in a wide range of fields such as reinforcement of structural materials for airplanes and vehicles and concrete structures, including sports goods such as golf clubs, tennis rackets and fishing rods. In recent years, carbon fibers have been used for casings of electronic and electric equipment such as notebook computers and video cameras because carbon fibers have not only excellent mechanical properties but also electrical conductivity, and carbon fibers are useful for thinning the casings and reducing the weight of the devices. Such a carbon-fiber-reinforced composite material is often obtained by laminating prepregs obtained by impregnating reinforcing fibers with a thermosetting resin.

Among various applications of carbon-fiber-reinforced composite materials, in particular, in structural materials and interior materials for aircraft, vehicles, and the like, it is strongly required that the materials have flame retardancy so that the materials will not be ignited and combusted due to a fire. In addition, in electronic and electrical equipment applications as well, flame retardancy of materials is required in order to prevent an accident in which a casing, a component, or the like is ignited and combusted due to heat generation from the inside of the device or exposure to a high temperature of the outside.

As a method of improving the flame retardancy, a method of blending a flame retardant in a thermosetting resin is widely used (for example, Patent Document 1). However, since the portion of a filler serves as a fracture origin and deteriorates mechanical properties, it is necessary to reduce a mixing amount of the filler.

Thus, a technique of a laminate in which prepregs mixed with a flame-retardant filler are stacked on both surfaces of a surface layer portion is disclosed (for example, Patent Document 2). In addition, a technique of a prepreg in which a flame-retardant filler is blended on one surface of the prepreg and a cyanate ester-based resin having a high flame retardant effect is used on the other surface is disclosed (for example, Patent Document 3).

PATENT DOCUMENTS

Patent Document 1: International Publication No. 2005/082982

Patent Document 2: Japanese Patent Laid-open Publication No. 2007-231073

Patent Document 3: Japanese Patent Laid-open Publication No. 2008-214547

SUMMARY OF THE INVENTION

However, in a laminate in which the flame-retardant filler is stacked on both surfaces of a surface portion, which is the technique of Patent Document 2, there is a problem that the flame retardancy is low and it is insufficient to suppress deterioration in physical properties that develops from the vicinity of both surface layers. In the prepreg in which the flame-retardant filler is mixed on one side and a flame-retardant resin is used on the other side, which is the technique of Patent Document 3, although both the flame retardancy and the physical properties can be achieved, there is a problem in moldability of the laminate, such as delamination due to a difference in shrinkage between different resins on both sides of the prepreg.

An object of the present invention is to solve the problems in the prior art described above and to provide a laminate which is a lightweight fiber-reinforced composite material capable of maintaining mechanical properties while exhibiting excellent flame retardancy, and to provide a prepreg suitable for obtaining such a fiber-reinforced composite material.

In order to solve such a problem, the present invention has the following configurations. That is, the present invention provides a laminate including: fibers; a matrix resin; and a flame-retardant filler, wherein in a cross section at 45° with respect to a fiber direction, when an area occupied by the flame-retardant filler in the entire cross section at 45° is 100%, an area occupied by the flame-retardant filler in a range of 400 μm from one outermost surface of the laminate is 70% or more, and when a flame-retardant filler area in the range of 400 μm from the outermost surface in the cross section at 45° is A, and a matrix resin area is B, the following relational expression is satisfied.

$$0.01 < A/B < 0.2$$

According to a preferred aspect of the laminate of the present invention, the thickness is 4 mm or more.

According to a preferred aspect of the laminate of the present invention, an average particle diameter of the flame-retardant filler is larger than a fiber diameter and 60 μm or less.

According to a preferred aspect of the laminate of the present invention, the flame-retardant filler contains a phosphorus atom.

According to a preferred aspect of the laminate of the present invention, the flame-retardant filler contains 60% by mass or more of red phosphorus.

According to a preferred aspect of the laminate of the present invention, some or all of the fibers are a woven fabric.

According to a preferred aspect of the laminate of the present invention, the fibers contained in an outermost layer on a side where the area occupied by the flame-retardant filler in the range of 400 μm from the outermost surface is 70% or more are the woven fabric.

The present invention further provides a prepreg including: fibers; a matrix resin; and a flame-retardant filler, wherein when an uneven distribution rate of a flame-retardant filler in a cross section at 45° with respect to a fiber direction is 66% or more, and when a flame-retardant filler area in the cross section is A and a matrix resin area is B, the following relational expression is satisfied:

$$0.01 < A/B < 0.15.$$

According to a preferred embodiment of the prepreg of the present invention, the flame-retardant filler contains a phosphorus atom.

According to a preferred aspect of the prepreg of the present invention, the flame-retardant filler contains 60% by mass or more of red phosphorus.

According to a preferred aspect of the prepreg of the present invention, the flame-retardant filler is contained in an amount of 1.5 to 25 parts by mass based on 100 parts by mass of an epoxy resin in the matrix resin.

According to a preferred aspect of the prepreg of the present invention, an average particle diameter of the flame-retardant filler is larger than a fiber diameter and 60 μm or less.

According to a preferred aspect of the prepreg of the present invention, a fiber form is a woven fabric.

According to a preferred aspect of the prepreg of the present invention, a composition of the matrix resin includes an epoxy resin [A], an amine-type curing agent [B], a flame-retardant filler [C], and a thermoplastic resin [D], one side of the prepreg satisfies the following conditions [a] and [b], and the other side satisfies the following conditions [a] and [c].

- [a] When a total amount of the epoxy resin [A] is 100 parts by mass, the epoxy resin [A] contains 30 to 100 parts by mass of a glycidylamine-type epoxy resin [A1].
- [b] The matrix resin contains 3 to 50 parts by mass of the flame-retardant filler [C] and 10 to 20 parts by mass of the thermoplastic resin [D] based on 100 parts by mass of the epoxy resin [A].
- [c] The matrix resin contains 10 to 20 parts by mass of the thermoplastic resin [D] based on 100 parts by mass of the epoxy resin [A].

The laminate is produced by stacking the prepreg so that a side where the flame-retardant filler is unevenly distributed is the outermost layer.

According to the present invention, it is possible to obtain an effect of achieving both flame retardancy and mechanical properties of a fiber-reinforced composite material in which the fiber is, for example, a carbon fiber. The fiber-reinforced composite materials such as the laminate of the present invention and the laminate obtained from the prepreg are suitable for aircraft applications.

DETAILED DESCRIPTION OF EMBODIMENTS OF THE INVENTION

A laminate of the present invention is a laminate including: fibers; a matrix resin; and a flame-retardant filler, wherein in a cross section at 45° with respect to a fiber direction, when an area occupied by the flame-retardant filler in the entire cross section at 45° is 100%, an area occupied by the flame-retardant filler in a range of 400 μm from one outermost surface of the laminate is 70% or more, and when a flame-retardant filler area in the range of 400 μm from the outermost surface in the cross section at 45° is A, and a matrix resin area is B, the following relational expression is satisfied.

$$0.01 < A/B < 0.2 \qquad (1).$$

In the laminate of the present invention, in the cross section at 45° with respect to the fiber direction, when the area occupied by the flame-retardant filler in the entire cross section at 45° is 100%, the area occupied by the flame-retardant filler in the range of 400 μm from one outermost surface of the laminate is 70% or more, preferably 80% or more, and more preferably 90% or more. Although the cross section in any direction may be applied, the fibers in 0° and 90° directions have the same cross-sectional shape by cutting at 45° with respect to a certain fiber direction, and an abundance ratio of the fibers, the resin, and the flame-retardant filler can be predicted without a large error. When the area occupied by the flame-retardant filler is 70% or more, the flame retardancy of the laminate can be efficiently exhibited. The ratio of the flame-retardant filler is evaluated according to an area measurement method described in Examples.

In the laminate of the present invention, Formula (1) is $0.01 < A/B < 0.2$, preferably $0.015 < A/B < 0.18$, and more preferably $0.02 < A/B < 0.16$. If the value of A/B exceeds 0.01, sufficient flame retardancy can be exhibited. The value of A/B is preferably larger, but is controlled so that the upper limit is less than 0.2. The flame-retardant filler area and the matrix resin area are evaluated according to the area measurement method described in Examples.

The laminate of the present invention preferably has a thickness of 4 mm or more. When the thickness is 4 mm or more, an influence of the flame-retardant filler of the surface layer on the mechanical properties is reduced, and the mechanical properties can be maintained while excellent flame retardancy is exhibited.

In the laminate of the present invention, an average particle diameter of the flame-retardant filler is preferably larger than a fiber diameter and 60 μm or less. Since the average particle diameter is larger than the fiber diameter, when a fiber layer is impregnated with the resin, the flame-retardant filler is hardly impregnated into the fiber layer and remains on the surface layer, and high flame retardancy is exhibited. When the average particle diameter is 60 μm or less, a total surface area of the flame-retardant filler is sufficiently large, and a high flame retardant effect can be exhibited. The fiber diameter and the average particle diameter of the flame-retardant filler are evaluated according to a calculation method described in Examples.

In the laminate of the present invention, the flame-retardant filler preferably contains a phosphorus atom. When the flame-retardant filler contains phosphorus atoms, a harmful gas is hardly generated during combustion, and a high flame retardant effect can be exhibited.

In the laminate of the present invention, the flame-retardant filler preferably contains 60% by mass or more of red phosphorus. When the flame-retardant filler contains 60% by mass or more of red phosphorus, a phosphorus concentration per unit area of the filler is increased, and a higher flame retardant effect can be exhibited.

In the laminate of the present invention, some or all of the fibers are preferably a woven fabric. Since the form of the fiber is a woven fabric, even if the flame-retardant filler is added, the mechanical properties are hardly affected, and the flame retardancy can be enhanced.

In the laminate of the present invention, the fibers contained in an outermost layer on a side where the area occupied by the flame-retardant filler in the range of 400 μm from the outermost surface is 70% or more are preferably the woven fabric. Here, the outermost layer is a layer disposed on the outermost side of the laminate. Since the fibers contained in the outermost layer are the woven fabric, even if the flame-retardant filler is added, the mechanical properties are hardly affected, and the flame retardancy can be enhanced.

Next, a matrix resin that can be used for the laminate will be described.

The matrix resin contains an epoxy resin and a curing agent.

As the epoxy resin, a glycidyl ether type epoxy resin such as a liquid bisphenol A type epoxy resin, a liquid bisphenol F type epoxy resin, a solid bisphenol A type epoxy resin, a solid bisphenol S type epoxy resin, or an aliphatic epoxy resin, a glycidylamine-type epoxy resin, a glycidyl ester type epoxy resin, a rubber-modified epoxy resin, or the like can be preferably used. In the present invention, the term "liquid" refers to one that exhibits fluidity at 25° C.

The curing agent is an amine-type curing agent. The amine-type curing agent refers to a compound having a nitrogen atom in the curing agent molecule.

The curing agent is not particularly specified as long as it contains a nitrogen atom in the molecule, and examples thereof include aromatic polyamine compounds having active hydrogen such as 4,4'-diaminodiphenylmethane, 4,4'-diaminodiphenyl sulfone, 3,3'-diaminodiphenyl sulfone, m-phenylenediamine, m-xylylenediamine, and diethyltoluenediamine; aliphatic amines having active hydrogen such as diethylenetriamine, triethylenetetramine, isophoronediamine, bis(aminomethyl)norbornane, bis(4-aminocyclohexyl)methane, and dimer acid esters of polyethyleneimine; modified amines obtained by reacting such an amine having active hydrogen with a compound such as an epoxy compound, acrylonitrile, phenol, formaldehyde, and thiourea; third amines having no active hydrogen such as N,N-dimethylaniline, N,N-dimethylbenzylamine, 2,4,6-tris(dimethylaminomethyl)phenol, and a mono-substituted imidazole; polycarboxylic acid hydrazides such as dicyandiamide, tetramethylguanidine, adipic acid hydrazide, and naphthalene carboxylic acid hydrazide; and a Lewis acid complex such as a boron trifluoride ethylamine complex.

The amine-type curing agent preferably has a thermally active latency for its stability in the resin preparation step, storage stability at room temperature, or stability against heat history received in the step of impregnating a fiber such as a carbon fiber with the matrix resin. Here, the thermally active latency means a property that, although its activity is low as it is, the activity changes to a high state through a phase change, a chemical change, or the like by receiving a certain heat history.

In the matrix resin, a thermoplastic resin can be further blended for viscoelasticity control and toughness imparting.

Examples of such a thermoplastic resin include poly (methyl methacrylate), polyvinyl acetals such as polyvinyl formal and polyvinyl butyral, polyvinylpyrrolidone, polymers containing at least two selected from aromatic vinyl monomers, vinyl cyanide monomers, and rubbery polymers as constituent components, polyamides, polyesters, polycarbonates, polyarylene oxides, polysulfones, polyethersulfones, polyimides, and phenoxy resins. Among them, polyvinyl formal and polyether sulfone are preferably used because they have good compatibility with many types of epoxy resins and the effect of controlling the fluidity of the matrix resin is large.

In the matrix resin, a thermoplastic resin component is preferably contained in an amount of 5 to 20 parts by mass based on 100 parts by mass of the epoxy resin. Within these ranges, both the drapability of the prepreg and the flame retardancy in the carbon-fiber-reinforced composite material can be achieved.

Next, the flame-retardant filler will be described.

As the flame-retardant filler, a phosphorus-containing compound, red phosphorus, a nitrogen-containing compound, a metal hydroxide, or a metal oxide can be preferably used.

As the red phosphorus, a pulverized product, a product processed so that a highly active cleavage plane does not appear on the surface, a product coated for enhancing stability, or the like may be used, and various other commercially available products may be used.

Examples of the nitrogen-containing compound include melamine derivatives such as melamine, melamine cyanurate, and melamine isocyanurate.

Examples of the metal hydroxide include aluminum hydroxide, magnesium hydroxide, calcium hydroxide, tin hydroxide, and zirconium hydroxide.

Examples of the metal oxide include magnesium oxide and aluminum oxide.

Among them, a phosphorus atom-containing compound and red phosphorus are preferable from the viewpoint of little influence on cured product characteristics of a thermosetting resin composition, and among them, red phosphorus having a high flame retardant effect when added in a small amount is particularly preferable. It is also possible to use red phosphorus and another phosphorus-containing compound in combination, for example, to use a plurality of kinds of non-halogen flame retardants in combination, such as red phosphorus and a metal hydroxide, red phosphorus and a phosphate ester, and red phosphorus and a nitrogen-containing compound.

Here, as red phosphorus, not only untreated red phosphorus but also one in which the surface of red phosphorus is coated with a metal hydrate and a resin to improve stability is used. Examples of the metal hydrate include aluminum hydroxide, magnesium hydroxide, zinc hydroxide, and titanium hydroxide. The type of the resin and the coating amount are not particularly limited, but the resin is preferably a phenol resin, an epoxy resin, polymethyl methacrylate, or the like having high affinity with the epoxy resin. In addition, the coating amount is preferably 1% by mass or more with respect to red phosphorus in order to suppress generation of phosphine gas at the time of kneading at a high temperature or the like. The coating amount is preferably as large as possible in terms of stability but is preferably not more than 40% by mass from the viewpoint of flame retardancy.

As the flame-retardant filler, one or a combination of two or more of other flame retardants may be used for improving the flame retardancy.

In the laminate of the present invention, it is preferable to use a carbon fiber as the fiber. Hereinafter, the fiber may be referred to as a reinforcing fiber. By using a carbon fiber as the reinforcing fiber, excellent flame retardancy, strength, and impact resistance can be exhibited in the fiber-reinforced composite material.

Although the carbon fiber used may be any known carbon fiber, a carbon fiber having a strand elastic modulus in a strand tensile test of 200 GPa or more and 450 GPa or less is preferably used. The strand tensile test refers to a test performed based on JIS R 7601 (1986).

The number of filaments of the carbon fiber is preferably 2,000 to 50,000, more preferably 2,500 to 40,000, from the viewpoint that the fiber arrangement does not meander and that resin impregnation is easy at the time of producing or molding the prepreg.

Carbon fibers used in the laminate of the present invention are classified into polyacrylonitrile-based carbon fibers, rayon-based carbon fibers, pitch-based carbon fibers, and the like. Of these, polyacrylonitrile-based carbon fibers, which have high tensile strength, are preferably used. A polyacrylonitrile-based carbon fiber can be produced through, for example, a process as described below. A spinning solution that contains polyacrylonitrile produced from monomers mainly formed of acrylonitrile is spun by wet spinning, dry-wet spinning, dry spinning, or melt spinning. To produce a carbon fiber, the coagulated thread after spinning is subjected to a yarn-making step to provide a precursor, which is then subjected to subsequent steps such as flameproofing and carbonization.

Examples of commercially available products of the carbon fiber include "TOPAYCA®" T700G-24K, TOPAYCA®" T300-3K, and "TOPAYCA®" T700S-12K having a tensile modulus of elasticity of 230 GPa, "TOPAYCA®" T800G-24K and "TOPAYCA®" T800S-24K having a tensile modulus of elasticity of 294 GPa, and "TOPAYCA®" T1100G-24K having a tensile modulus of elasticity of 324 GPa (all manufactured by Toray Industries, Inc.).

The form and filament-arrangement of carbon fiber is appropriately selectable from those of long fibers arranged in one direction and woven fabrics, and others; however, in order to give a carbon-fiber-reinforced composite material having a small weight and a higher-level endurance, preferred is the form of a continuous fiber, such as long fibers (fiber bundles) arranged in one direction or woven fabric. The long fiber herein refers to a fiber strand having an average length of 10 mm or more.

The carbon fiber bundle used in the laminate of the present invention preferably has a single fiber fineness of 0.2 to 2.0 dtex, more preferably 0.4 to 1.8 dtex, from the viewpoint of not damaging the carbon fiber bundle during twisting or in the impregnation treatment step of the resin composition and sufficiently impregnating the carbon fiber bundle with the resin composition.

The laminate of the present invention is obtained by stacking a prepreg obtained by impregnating a mixture of a matrix resin and a flame-retardant filler into a long fiber, a woven fabric, or the like in which carbon fibers are arranged in one direction, and then curing the prepreg.

The prepreg can be produced by various known methods. For example, the prepreg can be produced by a wet process in which a matrix resin is dissolved in an organic solvent selected from acetone, methyl ethyl ketone, methanol and the like to reduce its viscosity, and impregnated into reinforced fibers, or a hot-melt process in which the matrix resin is heated to reduce its viscosity without using an organic solvent and impregnated into reinforced fibers.

In the wet process, it is possible to immerse the reinforcing fiber in a liquid containing a matrix resin, then pull it up, and evaporate the organic solvent using an oven or the like to obtain a prepreg. Further, in the hot-melt process, a method of directly impregnating a reinforcing fiber with a matrix resin heated to reduce its viscosity, a method of impregnating a reinforcing fiber with a matrix resin by first preparing a release paper sheet with a resin film once coated with a matrix resin on a release paper or the like (hereinafter also referred to as "resin film"), then laminating a resin film on the reinforcing fiber side from both sides or one side of the reinforcing fiber, followed by heating and pressurizing, or the like can be used.

As a method for producing the prepreg, a hot-melt process of impregnating a reinforcing fiber with a matrix resin without using an organic solvent is suitably used because the prepreg is substantially free of organic solvent residue.

The prepreg in the present invention preferably has an amount of the reinforcing fibers per unit area of 70 to 2,000 $g/m^2$. When the amount of the reinforcing fiber is in the range of 70 to 2,000 $g/m^2$, the drapability of the prepreg is excellent, and when a fiber-reinforced composite material is molded, the number of laminated prepregs for obtaining a predetermined thickness is moderate, so that workability is excellent.

The mass content of the reinforcing fiber in the prepreg is preferably 30 to 90% by mass, more preferably 35 to 85% by mass, still more preferably 40 to 80% by mass. When the mass content of the reinforcing fibers in the prepreg is 30% by mass or more, a fiber-reinforced composite material excellent in specific strength and specific modulus of elasticity can be obtained, or the heat of reaction when the fiber-reinforced composite material is molded can be suppressed. When the mass content of the reinforcing fiber in the prepreg is 90% by mass or less, the reinforcing fiber is sufficiently impregnated with the matrix resin, and a laminate without voids can be obtained.

The laminate of the present invention can be produced by a method in which the above-described prepreg is stacked in a predetermined form and heated and pressurized to cure the matrix resin as an example. Herein, examples of a method of applying heat and pressure include a press molding method, an autoclave molding method, a bagging molding method, and an internal pressure molding method.

In addition, the laminate can be produced by a method in which a reinforcing fiber is directly impregnated with the above-described matrix resin without using a prepreg and then heated and cured, for example, a molding method such as a hand lay-up method, a filament winding method, and a resin transfer molding method.

When the prepreg is stacked, it is preferable that the prepreg mixed with the flame-retardant filler is stacked so as to be on the outermost layer of one surface. This is because the combustion proceeds from the outermost surface of the laminate, and thus enhancing the flame retardancy of the outermost surface is most effective. Although the configuration of the laminate is not particularly limited, when the thickness of the laminate is 4 mm or less, the fibers and the matrix resin are desirably symmetrical in the thickness direction in order to prevent deformation due to a difference in shrinkage during cooling of the cured resin.

In order to achieve the object of the present invention, it is preferable to unevenly distribute the flame-retardant filler in the prepreg on the outermost surface of the laminate. Next, the prepreg of the present invention will be described.

The prepreg of the present invention is a prepreg including: fibers; a matrix resin; and a flame-retardant filler, when an uneven distribution rate of the flame-retardant filler in the cross section at 45° with respect to the fiber direction is 66% or more, and when the flame-retardant filler area in the cross section is A and the matrix resin area is B, the following relational expression is satisfied.

$$0.01 < A/B < 0.15 \tag{1}$$

In the prepreg of the present invention, the uneven distribution rate of the flame-retardant filler in the cross section at 45° with respect to the fiber direction is 66% or more, preferably 75% or more, and more preferably 80% or more. When the uneven distribution rate of the flame-retardant filler is 66% or more, the flame retardancy of the laminate can be efficiently exhibited. The uneven distribution rate is evaluated according to the area measurement method described in Examples.

In the prepreg of the present invention, Formula (1) is more preferably 0.015<A/B<0.12, still more preferably 0.02<A/B<0.10. The fibers in 0° and 90° directions have the same cross-sectional shape by cutting at 45° with respect to the fiber direction, and the abundance ratio of the fibers, the resin, and the flame-retardant filler can be predicted without a large error. If the value of A/B exceeds 0.01, sufficient flame retardancy can be exhibited. The value of A/B is preferably as large as possible, but is controlled so that the upper limit is less than 0.15. The flame-retardant filler area and the matrix resin area are evaluated according to the area measurement method described in Examples.

In the prepreg of the present invention, the flame-retardant filler preferably contains a phosphorus atom. When the flame-retardant filler contains phosphorus atoms, a high flame retardant effect can be exhibited without generating a harmful gas during combustion.

In the prepreg of the present invention, the flame-retardant filler preferably contains 60% by mass or more of red phosphorus. When the flame-retardant filler contains 60% by mass or more of red phosphorus in the flame-retardant filler, the phosphorus concentration per unit area of the filler is increased, and a higher flame retardant effect can be exhibited.

In the prepreg of the present invention, the flame-retardant filler is contained preferably in an amount of 1.5 to 25 parts by mass, more preferably in an amount of 2 to 23 parts by mass, and still more preferably in an amount of 2.5 to 20 parts by mass based on 100 parts by mass of the epoxy resin contained in the matrix resin. When the amount of the flame-retardant filler is 1.5 parts by mass or more, sufficient flame retardancy can be exhibited. The amount of the flame-retardant filler is preferably as large as possible, but is preferably controlled so that the upper limit is 25 parts by mass.

In the prepreg of the present invention, the average particle diameter of the flame-retardant filler is preferably larger than the fiber diameter and 60 μm or less. Since the average particle diameter is larger than the fiber diameter, when the fiber layer is impregnated with the resin, the flame-retardant filler remains on the surface layer without impregnating the fiber layer, and high flame retardancy is exhibited. When the average particle diameter is 60 μm or less, a total surface area of the flame-retardant filler is sufficiently large, and a high flame retardant effect can be exhibited. The average particle diameter of the flame-retardant filler is evaluated according to the calculation method described in Examples.

In the prepreg of the present invention, the form of the fiber is preferably a woven fabric. Since the fiber is a woven fabric, even if the flame-retardant filler is added, the mechanical properties are not affected, and the flame retardancy can be enhanced.

The laminate produced using the prepreg of the present invention is preferably stacked so that a side where the flame-retardant filler is unevenly distributed is an outermost layer. Since the side where the flame-retardant filler is unevenly distributed is the outermost layer, combustion starting from the surface layer can be greatly suppressed.

In the prepreg of the present invention, it is preferable that the composition of the matrix resin includes an epoxy resin [A], an amine-type curing agent [B], a flame-retardant filler [C], and a thermoplastic resin [D], one side of the prepreg satisfies the following conditions [a] and [b], and the other side satisfies the following conditions [a] and [c].

[a] When a total amount of the epoxy resin [A] is 100 parts by mass, the epoxy resin [A] contains 30 to 100 parts by mass of a glycidylamine-type epoxy resin [A1].

[b] The matrix resin contains 3 to 50 parts by mass of the flame-retardant filler [C] and 10 to 20 parts by mass of the thermoplastic resin [D] based on 100 parts by mass of the epoxy resin [A].

[c] The matrix resin contains 10 to 20 parts by mass of the thermoplastic resin [D] based on 100 parts by mass of the epoxy resin [A].

When one side of the prepreg satisfies the conditions [a] and [b] and the other side satisfies the conditions [a] and [c], the flame-retardant filler can be unevenly distributed to the combustion side, and high flame retardancy can be exhibited.

Next, the matrix resin used in the prepreg of the present invention will be described.

The component [A] contains the glycidylamine-type epoxy resin [A1]. Here, the glycidylamine-type epoxy resin [A1] is preferably a tetraglycidylaminodiphenylmethane resin.

In the matrix resin, when the total amount of [A] is 100 parts by mass, [A] contains 30 to 100 parts by mass of [A1]. Thus, when the matrix resin is combined with a fiber such as a reinforcing fiber to form a prepreg, and the prepreg is heated and cured to form a fiber-reinforced composite material, high mechanical properties can be imparted.

Examples of the [A1] include a tetraglycidylaminodiphenylmethane resin.

Examples of commercially available products of the tetraglycidylaminodiphenylmethane resin include ELM434 (manufactured by Sumitomo Chemical Co., Ltd.), "Araldite®" MY 720, "Araldite®" MY 721, "Araldite®" MY 9512, and "Araldite®" MY 9663 (all manufactured by Huntsman Advanced Materials LLC.), and "Epotohto®" YH-434 (manufactured by Nippon Steel & Sumikin Chemical Co., Ltd.).

These resins may be used as [A1] singly or in combination with another epoxy resin.

In the epoxy resin [A] in the present invention, an epoxy resin other than the epoxy resin [A1] may be blended, and for example, a glycidyl ether type epoxy resin such as a liquid bisphenol A type epoxy resin, a liquid bisphenol F type epoxy resin, a solid bisphenol A type epoxy resin, a solid bisphenol S type epoxy resin, and an aliphatic epoxy resin, a glycidyl ester type epoxy resin, a glycidylamine-type epoxy resin, a rubber-modified epoxy resin, or the like may be blended. In the present invention, the term "liquid" refers to one that exhibits fluidity at 25° C.

The component [B] in the present invention is an amine-type curing agent. The amine-type curing agent refers to a compound having a nitrogen atom in the curing agent molecule.

The curing agent is not particularly specified as long as it contains a nitrogen atom in the molecule, and examples thereof include aromatic polyamine compounds having active hydrogen such as 4,4'-diaminodiphenylmethane, 4,4'-diaminodiphenyl sulfone, 3,3'-diaminodiphenyl sulfone, m-phenylenediamine, m-xylylenediamine, and diethyltoluenediamine; aliphatic amines having active hydrogen such as diethylenetriamine, triethylenetetramine, isophoronediamine, bis(aminomethyl)norbornane, bis(4-aminocyclohexyl)methane, and dimer acid esters of polyethyleneimine; modified amines obtained by reacting such an amine having active hydrogen with a compound such as an epoxy compound, acrylonitrile, phenol, formaldehyde, and thiourea;

third amines having no active hydrogen such as N,N-dimethylaniline, N,N-dimethylbenzylamine, 2,4,6-tris(dimethylaminomethyl)phenol, and a mono-substituted imidazole; polycarboxylic acid hydrazides such as dicyandiamide, tetramethylguanidine, adipic acid hydrazide, and naphthalene carboxylic acid hydrazide; and a Lewis acid complex such as a boron trifluoride ethylamine complex.

The amine-type curing agent [B] in the present invention preferably has a thermally active latency for its stability in the resin preparation step, storage stability at room temperature, or stability against heat history received in the step of impregnating a fiber such as a carbon fiber with the matrix resin. Here, the thermally active latency means a property that, although its activity is low as it is, the activity changes to a high state through a phase change, a chemical change, or the like by receiving a certain heat history.

The amine-type curing agent [B] preferably has a diphenylsulfone skeleton. By using a curing agent having a diphenylsulfone skeleton, a resin cured product having good heat resistance and a good flexural modulus of the resin cured product is obtained. In particular, various isomers of diaminodiphenyl sulfone are the most suitable curing agents because a resin cured product having good heat resistance and a good flexural modulus of the resin cured product can be obtained.

Examples of the isomer of diaminodiphenyl sulfone include 3,3'-diaminodiphenyl sulfone and 4,4'-diaminodiphenyl sulfone.

Examples of a commercially available product of the amine-type curing agent [B] include products 4,4'-DABAN and 3,4'-DABAN (all manufactured by Nipponjunryo Chemicals Co., Ltd.), Seikacure-S (manufactured by Wakayama Seika Kogyo Co., Ltd.), MDA-220 (manufactured by Mitsui Chemicals, Inc.), "jER CURE®" W (manufactured by Mitsubishi Chemical Corp.), 3,3'-DAS (manufactured by Mitsui Chemicals, Inc.), and "Lonzacure®" M-DEA, "Lonzacure®" M-DIPA, "Lonzacure®" M-MIPA and "Lonzacure®" DETDA 80 (all manufactured by a company, Lonza).

As the flame-retardant filler [C], a phosphorus-containing compound, red phosphorus, a nitrogen-containing compound, a metal hydroxide, or a metal oxide can be preferably used.

As the red phosphorus, a pulverized product, a product processed so that a highly active cleavage plane does not appear on the surface, a product coated for enhancing stability, or the like may be used, and various other commercially available products may be used.

Examples of the nitrogen-containing compound include melamine derivatives such as melamine, melamine cyanurate, and melamine isocyanurate.

Examples of the metal hydroxide include aluminum hydroxide, magnesium hydroxide, calcium hydroxide, tin hydroxide, and zirconium hydroxide.

Examples of the metal oxide include magnesium oxide and aluminum oxide.

Among them, a phosphorus atom-containing compound and red phosphorus are preferable from the viewpoint of little influence on cured product characteristics of a thermosetting resin composition, and among them, red phosphorus having a high flame retardant effect when added in a small amount is particularly preferable. It is also possible to use red phosphorus and another phosphorus-containing compound in combination, for example, to use a plurality of kinds of non-halogen flame retardants in combination, such as red phosphorus and a metal hydroxide, red phosphorus and a phosphate ester, and red phosphorus and a nitrogen-containing compound.

Here, as red phosphorus, not only untreated red phosphorus but also one in which the surface of red phosphorus is coated with a metal hydrate and a resin to improve stability is used. Examples of the metal hydrate include aluminum hydroxide, magnesium hydroxide, zinc hydroxide, and titanium hydroxide. The type of the resin and the coating amount are not particularly limited, but the resin is preferably a phenol resin, an epoxy resin, polymethyl methacrylate, or the like having high affinity with the epoxy resin used in the present invention. In addition, the coating amount is preferably 1% by mass or more with respect to red phosphorus in order to suppress generation of phosphine gas at the time of kneading at a high temperature or the like. The coating amount is preferably as large as possible in terms of stability but is preferably not more than 40% by mass from the viewpoint of flame retardancy.

In the matrix resin used in the present invention, one or a combination of two or more of other flame retardants may be used for improving the flame retardancy.

In the matrix resin used in the present invention, the thermoplastic resin [D] can be blended for viscoelasticity control and toughness imparting.

Examples of such a thermoplastic resin include poly(methyl methacrylate), polyvinyl acetals such as polyvinyl formal and polyvinyl butyral, polyvinylpyrrolidone, polymers containing at least two selected from aromatic vinyl monomers, vinyl cyanide monomers, and rubbery polymers as constituent components, polyamides, polyesters, polycarbonates, polyarylene oxides, polysulfones, polyethersulfones, polyimides, and phenoxy resins. Among them, polyvinyl formal and polyether sulfone are preferably used because they have good compatibility with many types of epoxy resins and the effect of controlling the fluidity of the matrix resin for a fiber-reinforced composite material is large. Examples of a commercially available product of polyvinyl formal include "VINYLEC®" K (manufactured by JNC Corporation), and examples of a commercially available product of polyethersulfone include "SUMIKAEXCEL®" PES 5003P (manufactured by Sumitomo Chemical Co., Ltd.).

In the matrix resin used in the present invention, a thermoplastic resin component is preferably contained in an amount of 10 to 20 parts by mass based on 100 parts by mass of the epoxy resin. Within these ranges, both the drapability of the prepreg and the flame retardancy of the fiber-reinforced composite material in which the fiber is, for example, a carbon fiber can be achieved.

In the prepreg of the present invention, it is preferable to use a reinforcing fiber such as a carbon fiber as the fiber. By using a carbon fiber as the fiber, excellent flame retardancy, strength, and impact resistance can be exhibited in the fiber-reinforced composite material.

The matrix resin in combination with a fiber can be used as a fiber-reinforced composite material. A carbon fiber can be preferably used as the fiber, and the carbon fiber used may be any known carbon fiber; however, a carbon fiber having a strand elastic modulus in a strand tensile test of 200 GPa or more and 450 GPa or less is preferably used. The strand tensile test refers to a test performed based on JIS R 7601 (1986).

The number of filaments of the carbon fiber is preferably 2,500 to 50,000, more preferably 2,800 to 40,000, from the viewpoint that the fiber arrangement does not meander and that resin impregnation is easy at the time of producing or molding the prepreg.

As the carbon fibers used in the present invention, those classified into polyacrylonitrile-based carbon fibers, rayon-based carbon fibers, pitch-based carbon fibers, and the like can be used. Of these, polyacrylonitrile-based carbon fibers, which have high tensile strength, are preferably used. A polyacrylonitrile-based carbon fiber can be produced through, for example, a process as described below. A spinning solution that contains polyacrylonitrile produced from monomers mainly formed of acrylonitrile is spun by wet spinning, dry-wet spinning, dry spinning, or melt spinning. To produce a carbon fiber, the coagulated thread after spinning is subjected to a yarn-making step to provide a precursor, which is then subjected to subsequent steps such as flameproofing and carbonization.

Examples of commercially available products of the carbon fiber include "TOPAYCA®" T700G-24K, TOPAYCA®" T300-3K, and "TOPAYCA®" T700S-12K having a tensile modulus of elasticity of 230 GPa, "TOPAYCA®" T800G-24K and "TOPAYCA®" T800S-24K having a tensile modulus of elasticity of 294 GPa, and "TOPAYCA®" T1100G-24K having a tensile modulus of elasticity of 324 GPa (all manufactured by Toray Industries, Inc.).

The form and filament-arrangement of carbon fiber is appropriately selectable from those of long fibers arranged in one direction and woven fabrics, and others; however, in order to give a carbon-fiber-reinforced composite material having a small weight and a higher-level endurance, preferred is the form of a continuous fiber, such as long fibers (fiber bundles) arranged in one direction or woven fabric. The long fiber herein refers to a fiber strand having an average length of 10 mm or more.

The carbon fiber bundle used in the present invention preferably has a single fiber fineness of 0.2 to 2.0 dtex, more preferably 0.4 to 1.8 dtex, from the viewpoint of not damaging the carbon fiber bundle during twisting or in the impregnation treatment step of the resin composition and sufficiently impregnating the carbon fiber bundle with the resin composition.

The prepreg of the present invention can be produced by various known methods. For example, the prepreg can be produced by a wet process in which a matrix resin used in the prepreg of the present invention is dissolved in an organic solvent selected from acetone, methyl ethyl ketone, methanol and the like to reduce its viscosity, and impregnated into fibers, or a hot-melt process in which the matrix resin is heated to reduce its viscosity without using an organic solvent and impregnated into fibers.

In the wet process, it is possible to immerse the fiber in a liquid containing a matrix resin, then pull it up, and evaporate the organic solvent using an oven or the like to obtain a prepreg. Further, in the hot-melt process, a method of directly impregnating a fiber with a matrix resin heated to reduce its viscosity, a method of impregnating a fiber with a matrix resin by first preparing a release paper sheet with a resin film once coated with a matrix resin on a release paper or the like (hereinafter also referred to as "resin film"), then laminating a resin film on the fiber side from both sides or one side of the fiber, followed by heating and pressurizing, or the like can be used.

As a method for producing the prepreg of the present invention, a hot-melt process of impregnating a fiber with a matrix resin without using an organic solvent is suitably used because the prepreg is substantially free of organic solvent residue.

The prepreg of the present invention preferably has an amount of the fibers per unit area of 70 to 2,000 g/m$^2$. When the amount of the fiber is in the range of 70 to 2,000 g/m$^2$, the drapability of the prepreg is excellent, and when a fiber-reinforced composite material is molded, the number of laminated prepregs for obtaining a predetermined thickness is moderate, so that workability is excellent.

The mass content of the fiber in the prepreg of the present invention is preferably 30 to 90% by mass, more preferably 35 to 85% by mass, still more preferably 40 to 80% by mass. When the mass content of the fibers in the prepreg is 30% by mass or more, a fiber-reinforced composite material excellent in specific strength and specific modulus of elasticity can be obtained, or the heat of reaction when the fiber-reinforced composite material is molded can be suppressed. When the mass content of the fiber in the prepreg is 90% by mass or less, the fiber is sufficiently impregnated with the matrix resin, and a fiber-reinforced composite material without voids can be obtained.

The laminate produced using the prepreg of the present invention can be produced by a method in which the above-described prepreg of the present invention is stacked in a predetermined form and heated and pressurized to cure the matrix resin as an example. Herein, examples of a method of applying heat and pressure include a press molding method, an autoclave molding method, a bagging molding method, and an internal pressure molding method.

In addition, the fiber-reinforced composite material can be produced by a method in which a fiber is directly impregnated with the matrix resin without using a prepreg and then heated and cured, for example, a molding method such as a hand lay-up method, a filament winding method, and a resin transfer molding method.

When the prepreg is stacked, the flame-retardant filler is preferably unevenly distributed on the outermost surface. This is because the combustion proceeds from the outermost surface of the laminate, and thus enhancing the flame retardancy of the outermost surface is most effective. In order to dispose the flame-retardant filler on the outermost surface, a surface on which the flame-retardant filler is unevenly distributed is disposed on the outer side. This can be achieved by using the surfaces on which the flame-retardant filler is unevenly distributed as the first layer and the final layer when the laminate is stacked.

The laminate of the present invention or a laminate (laminated plate of a fiber-reinforced composite material) obtained by stacking and curing the prepreg of the present invention (as the flame retardancy measured with a thickness of 2 mm) has high flame retardancy of a peak heat release rate of less than 100 kW·m$^{-2}$ and an average value of total heat release for 2 minutes from the start of 100 kW·min·m$^{-2}$ or less in a heat release test (OSU method) in accordance with FAR 25.853 (Appendix F, Part IV).

EXAMPLES

The present invention will be illustrated below with reference to Examples, but it should be understood that the present invention is not construed as being limited thereto. The materials used in examples and comparative examples are shown below.

<Component [A1]: Glycidylamine-Type Epoxy Resin>
ELM434 (tetraglycidyldiaminodiphenylmethane resin, manufactured by Sumitomo Chemical Co., Ltd.).

GAN (N,N-diglycidyl aniline resin, manufactured by Nippon Kayaku Co., Ltd.).

<Other Epoxy Resin Components>

"jER®" 825 (liquid bisphenol A-type epoxy resin, manufactured by Mitsubishi Chemical Corporation).

<Component [B]: Amine-Type Curing Agent>

"SEIKACURE®"-S (4,4'-diaminodiphenylsulfone, manufactured by Wakayama Seika Kogyo Co., Ltd.).

<Component [C]: Flame-Retardant Filler>

"RINKA®" FR 120UF (surface-coated red phosphorus, phosphorus content: 75% by mass, manufactured by RIN KAGAKU KOGYO Co., Ltd.).

"EXOLIT®" AP462 (ammonium polyphosphate, phosphorus content: 29 to 31% by mass, manufactured by Clariant AG).

<Component [D]: Thermoplastic Resin>

"SUMIKAEXCEL®" 5003P (polyethersulfone, manufactured by Sumitomo Chemical Co., Ltd.) 10 parts by mass.

<Carbon Fiber>

"TOPAYCA®" T800SC-24K (tensile strength: 5.9 GPa, tensile modulus of elasticity: 294 GPa, specific gravity of fiber: 1.80, manufactured by Toray Industries, Inc.).

<Fiber Fabric>

Carbon fiber fabric ("TORAYCA" cloth CO6343B manufactured by Toray Industries, Inc.)

Carbon fiber: TORAYCA T300B (3K)

Weave structure: plain weave

Warp density: 12.5/25 mm Weft density: 12.5/25 mm

Weight per unit area: 198 g/m² Thickness: 0.23 mm

<Prepreg Sheet>

Prepreg sheet: "TORAYCA®" prepreg sheet P2352W-19

Reinforcing fiber: T800S

Matrix resin: 3900-2B

Volume content of reinforcing fiber: 56%

<Heat Release Test (OSU Method)>

The laminate produced in item (4) or (10) described later was subjected to the heat release test (OSU method) in accordance with FAR 25.853 (Appendix F, Part IV) so that a combustion surface was a prepreg produced in item (3) or (8) described later, and the peak heat release rate and the average value of total heat release for 2 minutes from the start were evaluated. As a determination criterion, a case where the peak heat release rate was 100 kW·m$^{-2}$ or less and the average value of total heat release for 2 minutes from the start satisfied 100 kW·min·m$^{-2}$ or less was regarded as acceptable, and other cases were regarded as unacceptable.

The basic production of the laminates in Examples 1 to 8 and Comparative Examples 1 to 4 was performed as follows.

(1) Method of Preparing Matrix Resin

An epoxy resin and a thermoplastic resin corresponding to Table 1 were put into a kneading machine, and then heated and kneaded. Subsequently, the temperature was lowered to 60° C. or lower, and an amine-type curing agent corresponding to Table 1 was added and stirred so as to be uniformly dispersed, thereby obtaining a matrix resin.

(2) Method of Preparing Flame-Retardant Filler-Mixed Matrix Resin

An epoxy resin, a thermoplastic resin, and a flame-retardant filler corresponding to Table 1 were charged into a kneading machine, and then heated and kneaded. Subsequently, the temperature was lowered to 60° C. or lower, and an amine-type curing agent corresponding to Table 1 was added and stirred so as to be uniformly dispersed, thereby obtaining a flame-retardant filler-mixed matrix resin.

(3) Preparation of Prepreg 66 g/m² of the matrix resin prepared in items (1) and (2) was applied to release paper to produce a resin film. The resin film was set in a prepreg producing machine, superimposed on a carbon fiber fabric from both sides of the "TORAYCA®" cloth CO6343B such that both sides were the films of the matrix resin prepared in item (1) and the film of the flame-retardant filler-mixed matrix resin prepared in item (2), and heated and pressurized to be impregnated with the matrix resin, thereby producing a prepreg having a matrix resin mass fraction of 40% by mass.

(4) Production of Laminate of Carbon-Fiber-Reinforced Composite Material

The "TOPAYCA®" prepreg sheet P2352W-19 was stacked by 11 plies or 21 plies by cross-plying, and while the prepreg prepared in item (3), which was the film of the matrix resin with both surfaces adjusted in item (1), was stacked on one side thereof, the prepreg prepared in item (3), whose both surfaces were the films of the matrix resin in item (2), was stacked on the other side to prepare a laminate having a thickness of 2 mm (2.4 mm) or 5 mm (5.0 mm) as a whole. A piece was cut out from the laminate so as to have a width of 150 mm and a length of 150 mm.

(5) Method of Evaluating Mixing Amount of Flame-Retardant Filler in Laminate

The laminate obtained in item (4) was embedded in an epoxy resin prepared by mixing EpoKwick FC Resin (Buehler) as a main agent and Epokwick FC Hardener (Buehler) as a curing agent, and cured at room temperature, and then a cross section in a 45° direction with respect to a fiber axis was wet-polished. The length of the exposed laminate cross section of 2 mm was observed at a total magnification of 500 times using an objective lens of 50 times of an optical microscope.

When the area occupied by the flame-retardant filler is 100%, the area ratio occupied by the flame-retardant filler in the range of 400 μm from one outermost surface of the laminate was obtained by calculating the area occupied by the flame-retardant filler and an area A occupied by the flame-retardant filler in the range of 400 μm from one outermost surface of the laminate in a cross-sectional microscopic image of a polished surface. For the analysis, the Trainable WEKA Segmentation plug-in of the image analysis program FIJI was used. First, in the cross-sectional image, a separate classifier for identifying region division of the fiber, the matrix resin, and the flame-retardant filler was determined, and applied to the entire cross-sectional image to determine an area At occupied by the flame-retardant filler. Next, a portion of 400 μm from the outermost surface where the flame-retardant filler existed was cut out from the entire cross-sectional image, and similarly, the area A occupied by the flame-retardant filler was determined to derive the area ratio.

The value A/B, which was a ratio of the total cross-sectional area A of the flame-retardant filler to a matrix resin cross-sectional area B in the range of 400 μm from the outermost layer of the laminate, was obtained by calculating the resin cross-sectional area B and the flame-retardant filler cross-sectional area A in the range of 400 μm of the outermost surface mixed with the flame-retardant filler in the cross-sectional microscopic image of the polished surface using the Trainable WEKA Segmentation plug-in of the image analysis program FIJI in the same manner.

Using the Trainable WEKA Segmentation plug-in of the image analysis program FIJI, the fiber diameter was identified and derived by region division from the cross-sectional image in the range of 400 μm from the outermost surface where the flame-retardant filler existed. Specifically, an area $F_i$ (i=1 to n: the number of fibers in the cross-sectional image) of each fiber was derived, and each fiber diameter $f_i$ was calculated from the value. Assuming a fiber cross section of a plane perpendicular to the fiber axis as a circle, the fiber diameter $f_i$ can be calculated as follows, considering that the cross-sectional area $F_i$ is 45° with respect to the fiber direction.

$$f_i = (F_i/\Pi \times 2\sqrt{2})^{0.5}$$

An average value of the fiber diameters $f_1$ to $f_n$ thus derived was defined as the fiber diameter.

The average particle diameter of the flame-retardant filler was determined from a number average value A/N of the cross-sectional area A determined by the above method. Here, assuming that the shape of the flame-retardant filler is a sphere, the cross-sectional area of the flame-retardant filler obtained by the above method is an arbitrary circle intersected perpendicular to an axis passing through the center of the sphere. Thus, an expected value S of the cross-sectional area is a value obtained by dividing a volume of the sphere by a diameter length 2r of a central axis, where r is a radius of the flame-retardant filler assumed to be a sphere, and can be calculated by the following formula.

$$S = \tfrac{2}{3} \times \Pi \times r^2$$

Here, S=A/N, and an average particle diameter 2r of the flame-retardant filler was determined by the following formula.

$$2r = (6 \times A/(\Pi \times N))^{0.5}.$$

Examples 1 to 4

The matrix resin shown in item (2) was prepared by blending "RINKA®" FR 120UF as the component [C] so as to have A/B and the area occupied by the flame-retardant filler in the range of 400 μm from one outermost surface of the laminate shown in Table 1, and a prepreg was prepared using the "TOPAYCA®" cloth CO6343B. In addition, the prepreg was used together with the "TOPAYCA®" prepreg sheet P2352W-19 to prepare a laminate having a thickness of 2 mm. From the cross-section observation of the laminate, the ratio A/B of the flame-retardant filler area to the resin area was calculated. The heat release test (OSU method) was also conducted, and the result showed that the flame retardancy was good.

Examples 5 and 6

A laminate of a carbon-fiber-reinforced composite material was produced in the same manner as in Examples 1 to 4 except that "EXOLIT®" AP462 was blended as the flame-retardant filler so as to have A/B and the area occupied by the flame-retardant filler in the range of 400 μm from one outermost surface of the laminate shown in Table 1. The heat release test (OSU method) was also conducted, and the result showed that the flame retardancy was good.

Example 7

A laminate was produced in the same manner as in Example 2, except that the components shown in Table 1 were blended as the matrix resin. The heat release test (OSU method) was also conducted, and the result showed that the flame retardancy was good.

Example 8

A laminate was produced in the same manner as in Example 2 except that the thickness of the laminate was 5 mm. The heat release test (OSU method) was also conducted, and the result showed that the flame retardancy was good.

Comparative Example 1

A laminate was produced in the same manner as in Examples 1 to 3 except that the flame-retardant filler was not contained. The heat release test (OSU method) was also conducted, and the result showed that the flame retardancy was insufficient.

Comparative Example 2

A laminate was produced in the same manner as in Comparative Example 1 except that the thickness of the laminate was 5 mm. The heat release test (OSU method) was also conducted, and the result showed that the flame retardancy was insufficient.

Comparative Example 3

When a prepreg was produced as in item (3) in the same manner as in Examples 1 to 3 except that "RINKA®" FR 120UF was blended as the flame-retardant filler so as to have A/B and the area occupied by the flame-retardant filler in the range of 400 μm from one outermost surface of the laminate shown in Table 1, the flame retardant effect was low, and the flame retardancy was insufficient.

Comparative Example 4

When a prepreg was produced as in item (3) in the same manner as in Examples 1 to 3 except that "EXOLIT®" AP462 was blended as the flame-retardant filler so as to have A/B and the area occupied by the flame-retardant filler in the range of 400 μm from one outermost surface of the laminate shown in Table 1, the flame retardant effect was low, and the flame retardancy was insufficient.

TABLE 1

|  |  | Example 1 | Example 2 | Example 3 | Example 4 | Example 5 | Example 6 | Example 7 |
|---|---|---|---|---|---|---|---|---|
| Epoxy resin (part (s) by mass) | ELM434 | 50 | 50 | 50 | 50 | 50 | 50 | 67 |
|  | "jER (registered trademark)" 825 | 50 | 50 | 50 | 50 | 50 | 50 |  |
|  | GAN |  |  |  |  |  |  | 33 |
| Curing agent (part (s) by mass) | "SEICACURE (registered trademark)" -S | 40 | 40 | 40 | 40 | 40 | 40 | 60 |

TABLE 1-continued

| | | | | | | | | |
|---|---|---|---|---|---|---|---|---|
| Thermoplastic resin (part(s) by mass) | "SUMIKAEXCEL (registered trademark)" 5003P | 10 | 10 | 10 | 10 | 10 | 10 | 10 |
| Laminate thickness (mm) | | 2 | 2 | 2 | 2 | 2 | 2 | 2 |
| Area occupied by flame-retardant filler in range of 400 μm from one outermost surface of laminate when area occupied by flame-retardant filler is 100% | | 94% | 96% | 97% | 96% | 95% | 95% | 988 |
| A/B*1 | "RINKA (registered trademark)" FR 120UF | 0.124 | 0.081 | 0.029 | 0.013 | | | 0.075 |
| | "EXOLIT (registered trademark)" AP462 | | | | | 0.061 | 0.031 | |
| Fiber diameter (μm) | | 6.5 | 6.5 | 6.5 | 6.5 | 6.5 | 6.5 | 6.5 |
| Average particle diameter (μm) of flame-retardant filler *2 | | 12 | 12 | 12 | 12 | 17 | 17 | 12 |
| Peak heat release rate (kW · m$^{-2}$) | | 90 | 78 | 79 | 97 | 90 | 95 | 60 |
| 2-minute integrated heat release rate (kW · min · m$^{-2}$) | | 87 | 75 | 76 | 88 | 90 | 90 | 40 |
| Determination | | A | A | A | A | A | A | A |

| | | Example 8 | Comparative Example 1 | Comparative Example 2 | Comparative Example 3 | Comparative Example 4 |
|---|---|---|---|---|---|---|
| Epoxy resin (part(s) by mass) | ELM434 | 50 | 50 | 50 | 50 | 50 |
| | "jER (registered trademark)" 825 GAN | 50 | 50 | 50 | 50 | 50 |
| Curing agent (part(s) by mass) | "SEICACURE (registered trademark)" -S | 40 | 40 | 40 | 40 | 40 |
| Thermoplastic resin (part(s) by mass) | "SUMIKAEXCEL (registered trademark)" 5003P | 10 | 10 | 10 | 10 | 10 |
| Laminate thickness (mm) | | 5 | 2 | 5 | 2 | 2 |
| Area occupied by flame-retardant filler in range of 400 μm from one outermost surface of laminate when area occupied by flame-retardant filler is 100% | | 95% | | | 90% | 90% |
| A/B*1 | "RINKA (registered trademark)" FR 120UF | 0.075 | | | 0.005 | |
| | "EXOLIT (registered trademark)" AP462 | | | | | 0.006 |
| Fiber diameter (μm) | | 6.5 | 6.5 | 6.5 | 6.5 | 6.5 |
| Average particle diameter (μm) of flame-retardant filler *2 | | 12 | | | 12 | 17 |
| Peak heat release rate (kW · m$^{-2}$) | | 90 | 126 | 130 | 110 | 120 |
| 2-minute integrated heat release rate (kW · min · m$^{-2}$) | | 45 | 127 | 60 | 110 | 130 |
| Determination | | A | B | B | B | B |

*1Ratio of total cross-sectional area A of flame-retardant filler to matrix resin cross-sectional area B in range of 400 μm from outermost layer of laminate evaluated in (4)
*2Average particle diameter of flame-retardant filler evaluated in (4)

The basic production of the laminates in Examples 9 to 14 and Comparative Examples 5 to 7 was performed as follows.

(6) Method of Preparing Matrix Resin

An epoxy resin corresponding to the component [A] and a thermoplastic resin corresponding to the component [D] shown in Table 2 were charged into a kneading machine, and then heated and kneaded to dissolve the component [D]. Subsequently, the temperature was lowered to 60° C. or lower, and an amine-type curing agent corresponding to the component [B] shown in Table 2 was added and stirred so as to be uniformly dispersed, thereby obtaining a matrix resin for a carbon-fiber-reinforced composite material.

(7) Method of Preparing Flame-Retardant Filler-Mixed Matrix Resin

An epoxy resin corresponding to the component [A], a flame-retardant filler corresponding to the component [C] and a thermoplastic resin corresponding to the component [D] shown in Table 2 were charged in a kneading machine and then heated and kneaded to dissolve the component [D]. Subsequently, the temperature was lowered to 60° C. or lower, and an amine-type curing agent corresponding to the component [B] was added and stirred so as to be uniformly dispersed, thereby obtaining a matrix resin for a carbon-fiber-reinforced composite material.

(8) Preparation of Prepreg 66 g/m² of the matrix resin prepared in items (6) and (7) was applied to release paper to produce a resin film. The resin film was set in a prepreg producing machine, superimposed from both sides of the "TOPAYCA®" cloth CO6343B as a carbon fiber fabric such that one side was the film of the matrix resin prepared in item (6) and the other side was the film of the matrix resin prepared in item (7), and heated and pressurized to be impregnated with the resin, thereby producing a prepreg having a matrix resin mass fraction of 40% by mass.

Then, 66 g/m² of the matrix resin prepared in item (6) was applied to release paper to produce a resin film. The resin film was set in a prepreg producing machine, superimposed on a carbon fiber fabric from both sides of the "TOPAYCA®" cloth CO6343B such that both sides were the films of the matrix resin prepared in item (6), and heated and pressurized to be impregnated with the resin, thereby producing a prepreg having a matrix resin mass fraction of 40% by mass. The prepreg was used in Comparative Example 5 described later.

Then, 66 g/m² of the matrix resin prepared in item (7) was further applied to release paper to produce a resin film. The resin film was set in a prepreg producing machine, superimposed on a carbon fiber fabric from both sides of the "TOPAYCA®" cloth CO6343B such that both sides were the films of the matrix resin prepared in item (7), and heated and pressurized to be impregnated with the resin, thereby producing a prepreg having a matrix resin mass fraction of 40% by mass. The prepreg was used in Comparative Example 7 described later.

(9) Method of Evaluating Mixing Amount of Flame-Retardant Filler in Prepreg

A sheet of the prepreg obtained in item (8) was cured in an autoclave at a temperature of 180° C. for 90 minutes under a pressure of 0.6 MPa at a temperature raising rate of 2.5° C./min. The cured prepreg was embedded in an epoxy resin prepared by mixing EpoKwick FC Resin (Buehler) as a main agent and Epokwick FC Hardener (Buehler) as a curing agent, and cured at room temperature, and then the cross section in the 45° direction with respect to the fiber axis was wet-polished. The length of the exposed prepreg cross section of 2 mm was observed at a total magnification of 500 times using an objective lens of 50 times of an optical microscope. The ratio A/B, which was the ratio of the total cross-sectional area A of the flame-retardant filler to the matrix resin cross-sectional area B, was obtained by calculating the resin cross-sectional area B and the flame-retardant filler cross-sectional area A from the cross-sectional microscopic image of the polished surface. For the analysis, the Trainable WEKA Segmentation plug-in of the image analysis program FIJI was used. In the cross-sectional image, the separate classifier for identifying the region division of the fiber, the matrix resin, and the flame-retardant filler was determined, and applied to the entire cross-sectional image. When the prepreg cross-sectional image is equally divided into two in the thickness direction, and the flame-retardant filler areas in the respective divided images are defined as Am and An, the uneven distribution rate is calculated by the following formula.

(uneven distribution rate (%))=$Am/(Am+An)\times 100$
provided that, $Am>An$.

The average particle diameter of the flame-retardant filler is determined from the number average value A/N of the cross-sectional area A determined by the above method. Here, assuming that the shape of the flame-retardant filler is a sphere, the cross-sectional area of the flame-retardant filler obtained by the above method is an arbitrary circle intersected perpendicular to an axis passing through the center of the sphere. Thus, an expected value S of the cross-sectional area is a value obtained by dividing a volume of the sphere by a diameter length 2r of a central axis, where r is a radius of the flame-retardant filler assumed to be a sphere, and can be calculated by the following formula.

$S=\tfrac{2}{3}\times\Pi\times r^2$

Here, S=A/N, and an average particle diameter 2r of the flame-retardant filler was determined by the following formula.

$2r=(6\times A/(\Pi\times N))^{0.5}$.

(10) Production of Laminate of Carbon-Fiber-Reinforced Composite Material

The prepreg prepared in item (8) and the "TOPAYCA®" prepreg sheet P2352W-19 were stacked by 9 plies in the configuration of (prepreg prepared in item (8)/0/90/0/90/0/90/0/prepreg prepared in item (8)) to prepare a laminate having a thickness of 2 mm (1.9 mm). In an autoclave, molding was performed at a temperature of 180° C. for 90 minutes under a pressure of 0.6 MPa at a temperature raising rate of 2.5° C./min to produce a laminate of a unidirectional material having a thickness of 2 mm (1.9 mm). A piece was cut out from the laminate so as to have a width of 150 mm and a length of 150 mm.

Examples 9 to 12

The matrix resin shown in item (2) was prepared by blending "RINKA®" FR 120UF as the component [C] so as to have A/B and the uneven distribution rate shown in Table 2, and a prepreg was prepared using the "TOPAYCA®" cloth CO6343B. From the cross-section observation of the prepreg, a ratio of the flame-retardant filler area to the resin area was calculated. In addition, the prepreg was used together with the "TOPAYCA®" prepreg sheet P2352W-19 to prepare a laminate. The heat release test (OSU method) was also conducted, and the result showed that the flame retardancy was good.

Example 13

A laminate of a carbon-fiber-reinforced composite material was produced in the same manner as in Examples 9 to 11 except that "EXOLIT®" AP462 was blended as the component [C] so as to have A/B and the uneven distribution rate shown in Table 2. The heat release test (OSU method) was also conducted, and the result showed that the flame retardancy was good.

Example 14

A laminate of a carbon-fiber-reinforced composite material was produced in the same manner as in Example 10 except that an epoxy resin corresponding to the component [A] shown in Table 2 was blended as the component [A]. The heat release test (OSU method) was also conducted, and the result showed that the flame retardancy was good.

Comparative Example 5

A laminate of a carbon-fiber-reinforced composite material was produced in the same manner as in Examples 9 to 11 except that the component [C] was not contained. The heat release test (OSU method) was also conducted, and the result showed that the flame retardancy was insufficient.

Comparative Example 6

When a prepreg was produced as in item (8) in the same manner as in Examples 9 to 11 except that "RINKA®" FR 120UF was blended as the component [C] so as to have A/B and the uneven distribution rate shown in Table 2, the flame retardant effect was low, and the flame retardancy was insufficient.

Comparative Example 7

When a prepreg was produced as in item (8) in the same manner as in Examples 9 to 11 except that "RINKA®" FR 120UF was blended as the component [C] so as to have A/B and the uneven distribution rate shown in Table 2, the flame retardant effect was low, and the flame retardancy was insufficient.

TABLE 2

|  |  | Example 9 | Example 10 | Example 11 | Example 12 | Example 13 | Example 14 |
|---|---|---|---|---|---|---|---|
| Epoxy resin [A] (part (s) by mass) | ELM434 | 50 | 50 | 50 | 50 | 50 | 67 |
|  | "jER (registered trademark)" 825 | 50 | 50 | 50 | 50 | 50 |  |
|  | GAN |  |  |  |  |  | 33 |
| Curing agent [B] (part (s) by mass) | "SEICACURE (registered trademark)" -S | 40 | 40 | 40 | 40 | 40 | 60 |
| Flame-retardant filler [ C] (part (s) by mass) | "RINKA (registered trademark)" FR 120UF | 10 | 20 | 30 | 5 |  | 20 |
|  | "EXOLIT (registered trademark)" AP462 |  |  |  |  | 20 |  |
| Uneven distribution rate |  | 83% | 83% | 91% | 83% | 96% | 83% |
| A/B*3 |  | 0.04 | 0.07 | 0.1 | 0.02 | 0.08 | 0.07 |
| Average particle diameter (μm) of flame-retardant filler*4 |  | 12 | 12 | 12 | 12 | 17 | 12 |
| Peak heat release rate (kW · m$^{-2}$) |  | 79 | 78 | 90 | 97 | 90 | 60 |
| 2-minute integrated heat release rate (kW · min · m$^{-2}$) |  | 76 | 75 | 87 | 88 | 90 | 40 |
| Determination |  | A | A | A | A | A | A |

|  |  | Comparative Example 5 | Comparative Example 6 | Comparative Example 7 |
|---|---|---|---|---|
| Epoxy resin [A] (part (s) by mass ) | ELM434 | 50 | 50 | 50 |
|  | "jER (registered trademark)" 825 | 50 | 50 | 50 |
|  | GAN |  |  |  |
| Curing agent [B] (part (s) by mass) | "SEICACURE (registered trademark)" -S | 40 |  |  |
| Flame-retardant filler [ C] (part (s) by mass) | "RINKA (registered trademark)" FR 120UF |  | 1 | 3 |
|  | "EXOLIT (registered trademark)" AP462 |  |  |  |
| Uneven distribution rate |  |  | 90% | 50% |
| A/B*3 |  |  | 0.005 | 0.016 |
| Average particle diameter (μm) of flame-retardant filler*4 |  |  | 12 | 12 |
| Peak heat release rate (kW · m$^{-2}$) |  | 126 | 110 | 110 |
| 2-minute integrated heat release rate (kW · min · m$^{-2}$) |  | 127 | 120 | 105 |
| Determination |  | B | B | B |

*3Ratio of total cross-sectional area A of flame-retardant filler to matrix resin cross-sectional area B evaluated in (8)
*4Average particle diameter of flame-retardant filler evaluated in (8)

The content in Table 1 represents parts by mass. In the determination, A was regarded as acceptable, and B was regarded as unacceptable.

In the laminate produced in Examples 9 to 14, in the cross section at 45° with respect to the fiber direction, when the area occupied by the flame-retardant filler in the entire cross section at 45° was 100%, the area occupied by the flame-retardant filler in the range of 400 μm from one outermost surface of the laminate was evaluated by the method described in the item (4), so that the area was 90% or more in all cases, and when the flame-retardant filler area in the range of 400 μm from the outermost surface in the cross section at 45° was A and the matrix resin area was B, A/B satisfied 0.01<A/B<0.2 in all cases, and in particular, Examples 9 to 11 and 13 to 14 satisfied 0.02<A/B<0.16. In Comparative Examples 6 and 7, 0.01>A/B was shown and Comparative Examples 6 and 7 did not satisfy 0.01<A/B<0.2".

The invention claimed is:

1. A laminate comprising:
   fibers;
   a matrix resin; and
   a flame-retardant filler,
   wherein in a cross section at 45° with respect to a fiber direction, when an area occupied by the flame-retardant filler in the entire cross section at 45° is 100%, an area occupied by the flame-retardant filler in a range of 400 μm from one outermost surface of the laminate is 70% or more, and when a flame-retardant filler area in the range of 400 μm from the outermost surface in the cross section at 45° is A, and a matrix resin area is B, the following relational expression is satisfied:

0.01<A/B<0.2.

2. The laminate according to claim 1, wherein a thickness is 4 mm or more.

3. The laminate according to claim 1, wherein an average particle diameter of the flame-retardant filler is larger than a fiber diameter and 60 μm or less.

4. The laminate according claim 1, wherein the flame-retardant filler contains a phosphorus atom.

5. The laminate according to claim 1, wherein the flame-retardant filler contains 60% by mass or more of red phosphorus.

6. The laminate according to any one of claims 1, wherein some or all of the fibers are a woven fabric.

7. The laminate according to claim 1, wherein the fibers contained in an outermost layer on a side where the area occupied by the flame-retardant filler in the range of 400 μm from the outermost surface is 70% or more are the woven fabric.

* * * * *